(12) United States Patent
Lussier et al.

(10) Patent No.: US 8,979,473 B2
(45) Date of Patent: *Mar. 17, 2015

(54) ATTACHMENT OF THREADED HOLES TO COMPOSITE FAN CASE

(75) Inventors: Darin S. Lussier, Berlin, CT (US); Thomas J. Robertson, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 907 days.

This patent is subject to a terminal disclaimer.

(21) Appl. No.: 12/986,209

(22) Filed: Jan. 7, 2011

(65) Prior Publication Data

US 2012/0177490 A1 Jul. 12, 2012

(51) Int. Cl.
| | | |
|---|---|---|
| F02C 7/20 | (2006.01) |
| F01D 25/28 | (2006.01) |
| F01D 21/04 | (2006.01) |
| F01D 25/24 | (2006.01) |
| B29C 65/48 | (2006.01) |
| B29C 65/50 | (2006.01) |

(Continued)

(52) U.S. Cl.
CPC .............. *F01D 25/28* (2013.01); *F01D 21/045* (2013.01); *F01D 25/243* (2013.01); *B29C 65/4835* (2013.01); *B29C 65/5014* (2013.01); *B29C 65/5021* (2013.01); *B29C 65/5042* (2013.01); *B29C 65/5057* (2013.01); *B29C 65/5064* (2013.01); *B29C 70/86* (2013.01); *B29C 65/562* (2013.01); *B29C 65/64* (2013.01); *B29C 66/1122* (2013.01); *B29C 66/532* (2013.01); *B29C 66/7212* (2013.01); *B29C 66/742* (2013.01); *B29C 65/02* (2013.01); *F05D 2300/603* (2013.01); *B29L 2031/3076* (2013.01); *B29C 66/00145* (2013.01); *B29C 66/919* (2013.01); *B29K 2705/00* (2013.01)
USPC .......... 415/9; 415/174.4; 415/200; 415/213.1

(58) Field of Classification Search
USPC ............... 415/9, 173.4, 174.4, 196, 197, 200, 415/214.1
See application file for complete search history.

(56) References Cited

U.S. PATENT DOCUMENTS

| | | |
|---|---|---|
| 4,113,910 A | 9/1978 | Loyd |
| 4,446,185 A | 5/1984 | Waragai et al. |

(Continued)

FOREIGN PATENT DOCUMENTS

| | | |
|---|---|---|
| EP | 1020845 A2 | 7/2000 |
| EP | 1927732 A2 | 6/2008 |

(Continued)

OTHER PUBLICATIONS

European Search Report for European Application No. 12150180.3 mailed on Nov. 4, 2014.

*Primary Examiner* — Nathaniel Wiehe
*Assistant Examiner* — Woody A Lee, Jr.
(74) *Attorney, Agent, or Firm* — Carlson, Gaskey & Olds, PC

(57) ABSTRACT

A composite fan case includes a composite fan case body having an outer surface. A bolt attachment is attached to the outer surface of the fan case and has an internal composite boss with at least one threaded metallic insert. The boss is attached to the outer surface of the fan case with a combination of fiber reinforced ply and adhesive. A bolt attachment and a method of attaching components to the outer periphery of the composite fan case are also disclosed.

13 Claims, 5 Drawing Sheets

(51) Int. Cl.
  *B29C 70/86* (2006.01)
  *B29C 65/56* (2006.01)
  *B29C 65/64* (2006.01)
  *B29C 65/00* (2006.01)
  *B29C 65/02* (2006.01)
  *B29L 31/30* (2006.01)
  *B29K 705/00* (2006.01)

(56) References Cited

U.S. PATENT DOCUMENTS

| | | |
|---|---|---|
| 5,079,055 A | 1/1992 | Doyle |
| 5,267,828 A * | 12/1993 | Lenhart et al. ............ 415/9 |
| 5,387,092 A | 2/1995 | Pettitt et al. |
| 5,887,332 A | 3/1999 | Champenois et al. |
| 6,132,857 A | 10/2000 | Champenois et al. |
| 7,357,547 B2 | 4/2008 | King et al. |
| 8,021,102 B2 * | 9/2011 | Xie et al. ............ 415/9 |
| 8,079,773 B2 * | 12/2011 | Blanton ............ 403/335 |
| 2008/0128073 A1 | 6/2008 | Xie et al. |
| 2009/0010755 A1 * | 1/2009 | Keller et al. ............ 415/197 |

FOREIGN PATENT DOCUMENTS

| | | |
|---|---|---|
| JP | 2007168397 A | 7/2007 |
| JP | 2008215465 A | 9/2008 |
| WO | 02066235 A1 | 8/2002 |

* cited by examiner

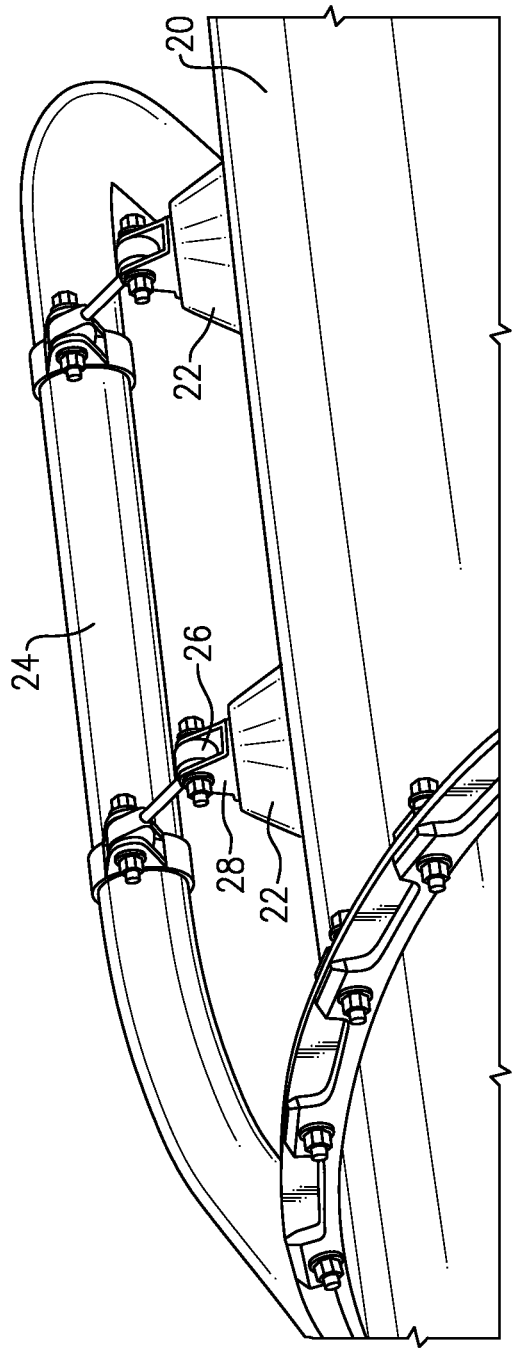
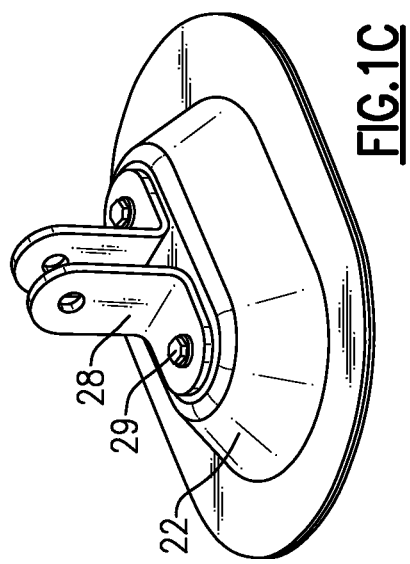

ATTACHMENT OF THREADED HOLES TO COMPOSITE FAN CASE

BACKGROUND

This application relates to creating threaded bolt holes in the outer periphery of a composite fan case for a gas turbine engine to provide mount locations for external components.

Gas turbine engines are known, and typically include a fan which delivers air toward a compressor. The air is compressed in the compressor, and passed downstream into a combustion chamber where it is mixed with fuel and burned. Products of this combustion pass downstream, driving turbine rotors to in turn drive a turbine shaft.

One recent development in turbine engines is a case for surrounding the fan rotor formed of a composite material, such as carbon epoxy.

While these fan cases have many desirable characteristics, one challenge is the components must be attached to the outer periphery of the case, typically through threaded fasteners. However, the material utilized to form the fan case has not been accommodating of bolt holes.

SUMMARY

A composite fan case includes a composite fan case body having an outer surface. A bolt attachment is attached to the outer surface of the fan case and has a composite boss with at least one threaded metallic insert. The boss is attached to the outer surface of the fan case using a combination of fiber reinforced ply and adhesive.

A bolt attachment and a method of attaching components to the outer periphery of the composite fan case are also disclosed.

These and other features of the present invention can be best understood from the following specification and drawings, the following of which is a brief description.

BRIEF DESCRIPTION OF THE DRAWINGS

FIG. 1B schematically shows a fan case according to the present invention.
FIG. 1C shows a detail.

DETAILED DESCRIPTION

Figure 1A:
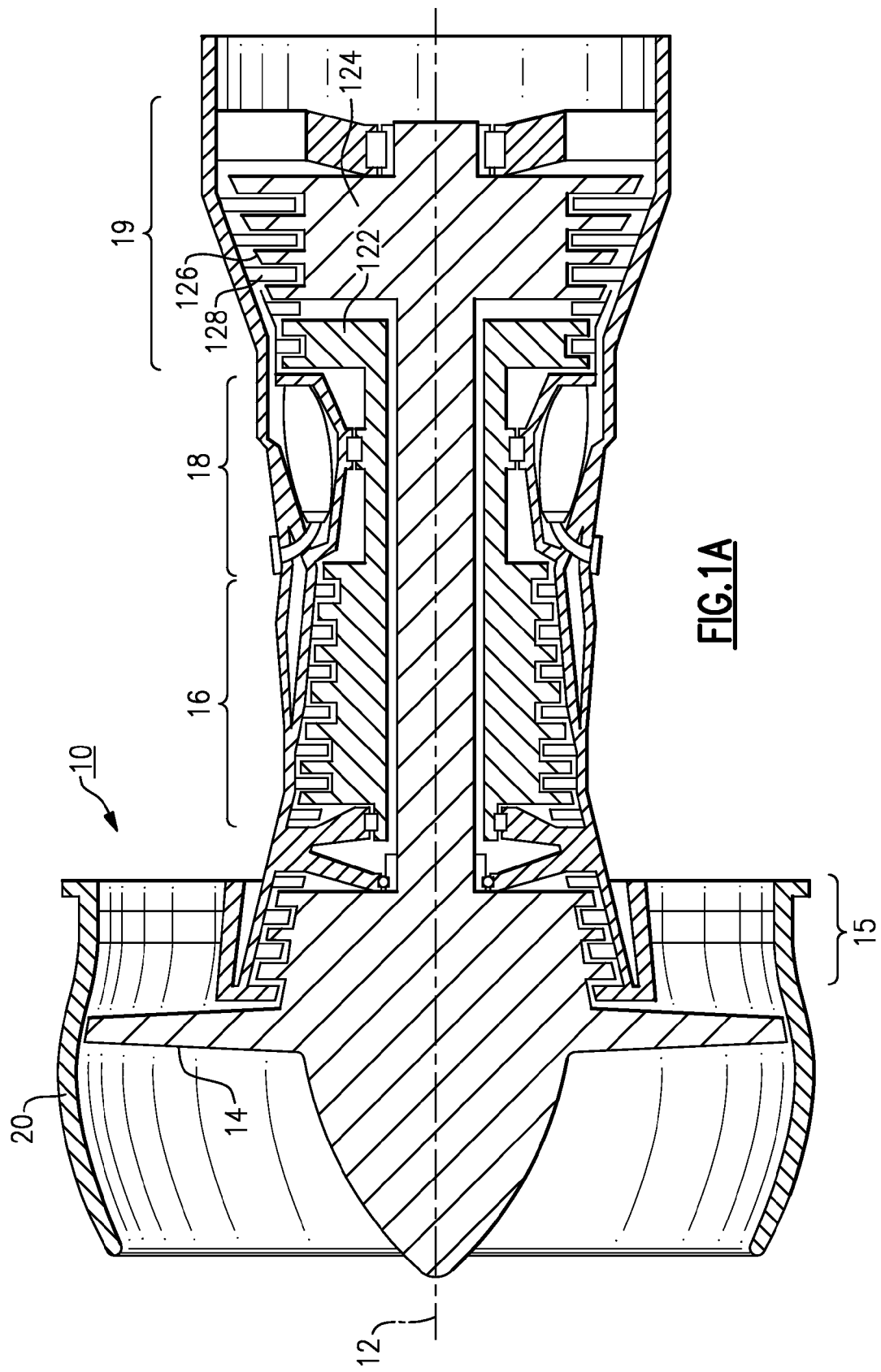
FIG. 1A shows a gas turbine engine.

A gas turbine engine 10, such as a turbofan gas turbine engine, circumferentially disposed about an engine centerline, or axial centerline axis 12 is shown in FIG. 1A. The engine 10 includes a fan 14, compressor sections 15 and 16, a combustion section 18 and a turbine 19. A fan case 20 surrounds the fan 14. As is well known in the art, air from fan 14 is compressed in the compressor 15/16, mixed with fuel and burned in the combustion section 18 and expanded in turbine 19. The turbine 19 includes rotors 122 and 124, which rotate in response to the expansion. The turbine 19 comprises alternating rows of rotary airfoils or blades 126 and static airfoils or vanes 128. In fact, this view is quite schematic, and blades 126 and vanes 128 are actually removable. It should be understood that this view is included simply to provide a basic understanding of the sections in a gas turbine engine, and not to limit the invention. This invention extends to all types of turbine engines for all types of applications.

A composite fan case 20 is illustrated in FIG. 1B. The fan case 20 is part of a gas turbine engine, and includes the fan rotor (see FIG. 1A) delivering air downstream towards the compressor.

Threaded bolt attachments 22 are mounted on the outer surface of the fan case 20, in a manner to be described below. A component 24 is attached to the attachments 22, such as through pins 26 mounted at a bracket 28. The component 24 is shown as a holding bracket for a fluid tube. Any number of other components, and types of mountings may benefit from the present invention. The bracket 28 is threadably attached, such as by bolts 29 (see FIG. 1C), to the attachment 22.

Figure 2A:
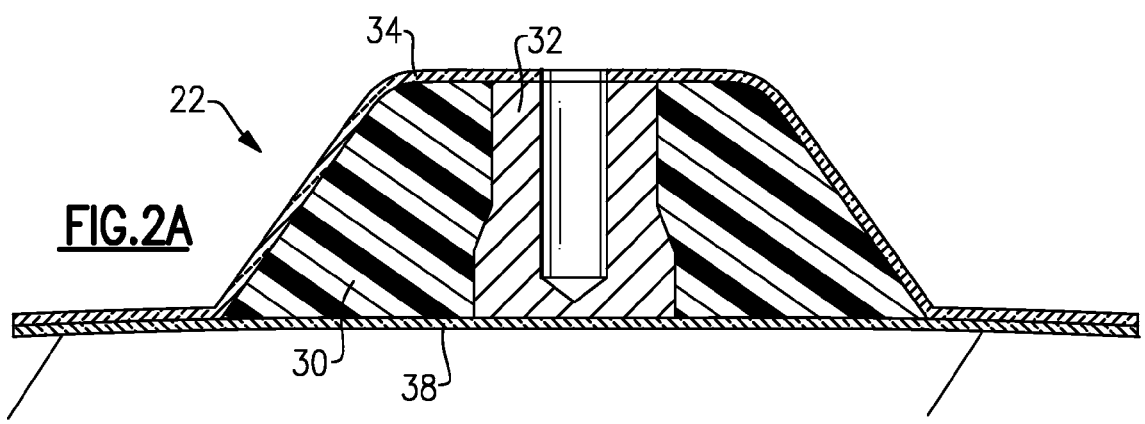
FIG. 2A is a cross-sectional view through a connection as incorporated into this invention.
Figure 2B:
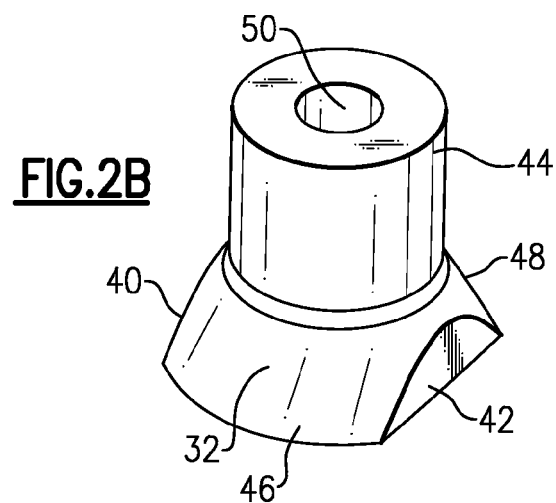
FIG. 2B shows an insert.

FIG. 2A shows a detail of the attachment 22, which includes a molded conical "bathtub" or boss which may be formed of a composite material 30. Of course, the bathtub or boss may be any number of different shapes including rectangular, square, oval, etc. Metallic inserts 32 are embedded within the composite material 30. A combination of fiberglass plies and adhesive 34 are attached to the outer surface of the composite material 30. Another combination of adhesive and fiberglass plies is formed on an inner surface of the composite material 30. This combination will be attached to the outer peripheral surface of the composite fan case 20, as will be described below. While fiberglass plies are disclosed, it should be understood that other fiber reinforced plies, such as carbon fiber reinforced plies, would come within the scope of this invention.

The insert 32 has flat ends 40 and 42, which will prevent rotation within the composite material 30. The other ends 46 and 48 are generally conical. An extending cylindrical portion 44 extends upwardly to a hole 50, which will receive a threaded insert, as will be explained below. Any number of other anti-rotation features can be utilized, such as any number of flat surfaces from one to any higher number.

Figure 2C:
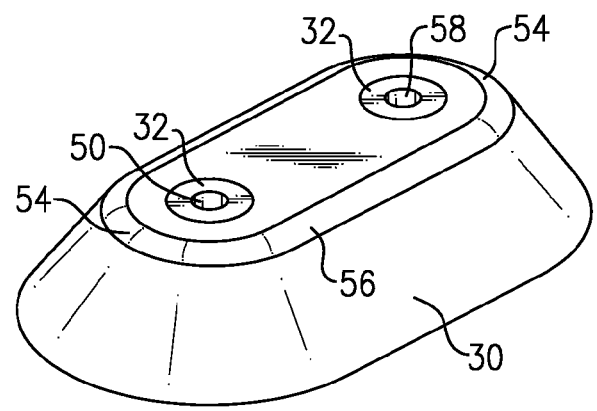
FIG. 2C is a view of a bolt attachment.

FIG. 2C shows that there are two of the inserts 32 received within the composite material 30. The conical portion 46 faces a short circular end 54, while the composite material 30 has elongated sides 56. Flat ends 40 and 42 of insert 32 face these sides 56. Of course, the invention extends to a single insert.

Figure 3A:
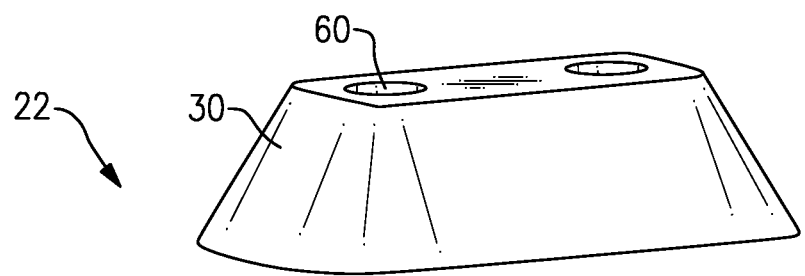
FIG. 3A shows a first step in assembling the attachment.
Figure 3B:
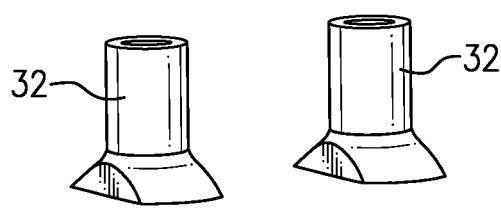
FIG. 3B is a cross-sectional view through the FIG. 3A structure.
Figure 3B:
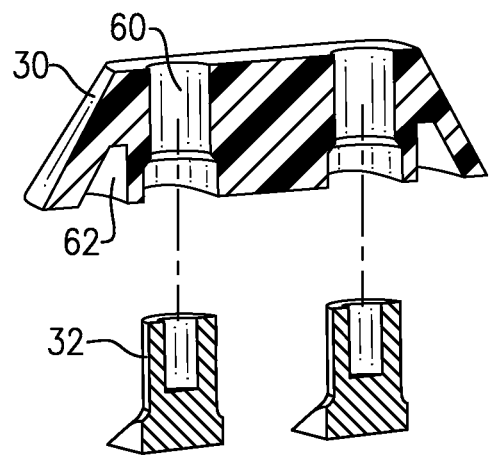

As shown in FIG. 3A, in assembling the attachment 22, the inserts 32 are initially inserted into openings 60 within premolded composite material 30. They could additionally be molded within the material 30. An adhesive may be placed on the metallic insert, to secure the metallic insert within the opening 60. Weight reduction or strengthening opening 62 (see FIG. 3B) may be formed within the composite material 30, as desired.

Figure 4:
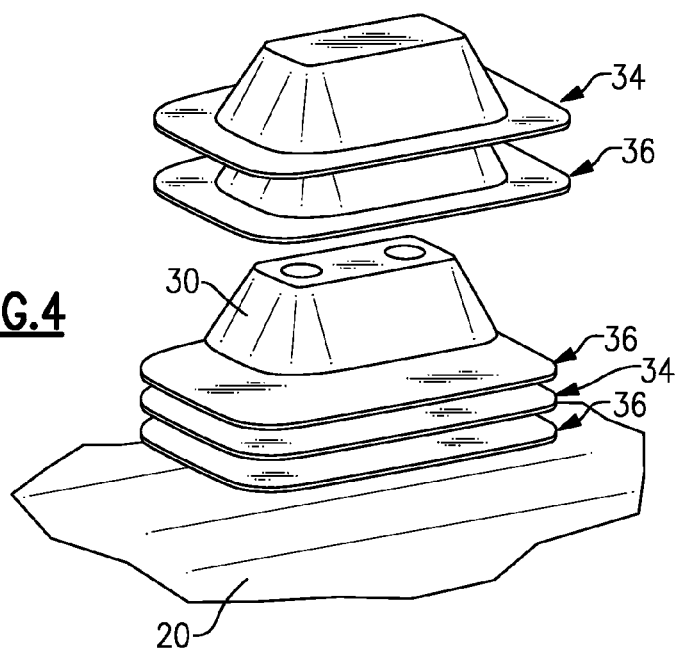
FIG. 4 shows a subsequent step.

FIG. 4 shows a subsequent step, wherein an adhesive layer, plurality of fiberglass plies, and an outer adhesive 36 are all attached to the composite fan case 20 at a bottom of the composite material 30. The upper combination includes plurality plies of fiberglass 34, with an adhesive layer 36 attached to the outer surface of the composite material 30.

Figure 5:
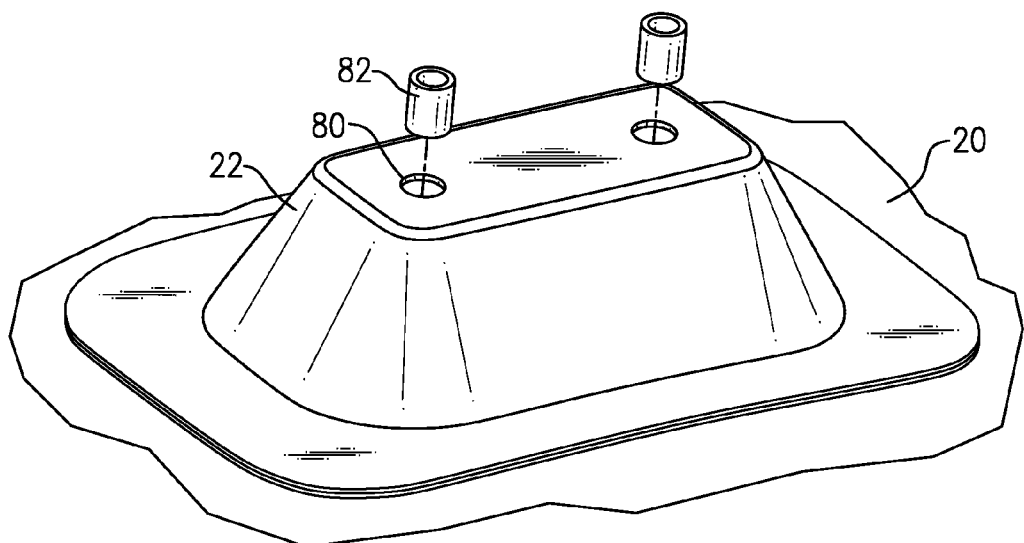
FIG. 5 shows another subsequent step.

Then, as shown in FIG. 5, the attachment 22 then has holes 80 drilled through the outer fiberglass and adhesive combination 34 to align with holes 50, and which then receives inserts 82 which are threaded.

A helical insert or key-lock insert may be utilized as the inserts 82. Examples of brand names would be Helicoil™ or Keensert™. Each of these inserts is threaded into the holes 50. In fact, the holes 50 can be formed with threads to receive the inserts. The point of the insert is generally to provide a breaking point which will break away from the attachment 22 prior to the attachment 22 breaking away from the fan case 20.

When the combined attachment 22 is placed on fan case 20, it is then heated and the fiberglass and adhesive cures, forming to the outer surface of the fan case 20, and is securely fastened.

Figure 6:
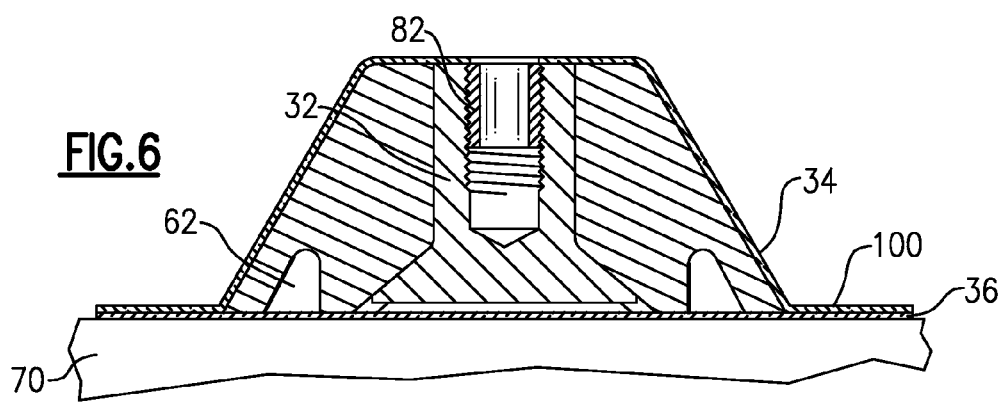
FIG. 6 is a cross-sectional view through an assembly.

FIG. 6 shows a cross-section, with the threaded insert 82 received within the insert 32. Openings 62 are formed on each side of the insert 32. As can be appreciated from FIG. 6, the upper combination 34 extends beyond the edges of the boss, such that there is an overlap area 100 where the upper combination and the lower combination are directly in contact.

In a sense, the upper ply combination captures the composite material 30 and the insert 32, and holds it on the fan case. The underlying fiber reinforced ply and adhesive combination 38 holds the combination against the fan case. The areas beyond the material 30 where the upper and lower plies are in contact form a strong bond.

To attach the structure to the fan case, the plies, such as seen for example in FIG. 2A, may be placed on the outer surface of a fan case. A vacuum may be applied, and the material heated, such as to about 250° F. (121° C.). An oven may be utilized to provide this heating. In this manner, the fiber reinforced plies and adhesive cure on the outer surface, and should not break away.

In embodiments, the upper adhesive 36 and fiberglass combination 34 includes three plies of fiberglass with a single ply of adhesive in contact with the boss. The lower adhesive and fiberglass combination 36 may include a ply of adhesive 26, three plies of fiberglass 34, and then a ply of adhesive 36. Also, in embodiments, the boss composite material 30 may be injection molded plastic, SMC, or some other filled epoxy. Of course, other materials may be utilized, and other arrangements of the adhesive and fiberglass can also be utilized.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A composite fan case comprising:
    a composite fan case body having an outer surface;
    at least one bolt attachment attached to said outer surface of said fan case body, said bolt attachment including an internal composite boss having at least one metallic insert, said metallic insert including a threaded bore, and said boss being attached to said outer surface of said body with a combination of at least one fiber reinforced ply and adhesive;
    an accessory attached to said at least one bolt attachment;
    wherein a threaded fastener attaches the accessory to the at least one bolt attachment; and
    said insert including conical surfaces on opposed circumferential ends of the threaded bore, and at least one flat side to prevent rotation of the insert within the boss.

2. The composite fan case as set forth in claim 1, wherein there are a plurality of opposed flat sides to prevent rotation.

3. The composite fan case as set forth in claim 1, wherein said fiber reinforced ply is a fiberglass ply.

4. A composite fan case comprising:
    a composite fan case body having an outer surface;
    at least one bolt attachment attached to said outer surface of said fan case body, said bolt attachment including an internal composite boss having at least one metallic insert, said metallic insert including a threaded bore, and said boss being attached to said outer surface of said body with a combination of at least one fiber reinforced ply and adhesive;
    an accessory attached to said at least one bolt attachment;
    wherein a threaded fastener attaches the accessory to the at least one bolt attachment;
    said boss has a plurality of said inserts; and
    each of said inserts receives a threaded insert.

5. A bolt attachment for being attached to an outer surface of a composite fan case in a gas turbine engine comprising:
    a composite boss receiving a plurality of metallic inserts, each of said metallic inserts including a threaded bore extending to an outer face of the boss;
    an inner face adhesive and fiber reinforced ply combination at an inner face of said boss, remote from the outer face, and said inner face adhesive and fiber reinforced ply combination for attachment to a composite fan case;
    an outer face adhesive and fiber reinforced ply combination attached to the outer face of said boss, with a hole through the outer face adhesive and fiber reinforced ply combination to provide connection to the threaded bore in each metallic insert; and
    wherein each of said metallic inserts receives a threaded insert.

6. The bolt attachment as set forth in claim 5, wherein each of said inserts include conical surfaces on opposed circumferential ends of the threaded bore, and at least one flat side to prevent rotation of the insert within the boss.

7. The bolt attachment as set forth in claim 5, wherein said inner face adhesive and fiber reinforced ply combination, which attaches said boss to said body, and said outer face adhesive and fiber reinforced ply combination each extend beyond said boss, and are in contact with each other at a location beyond said boss.

8. The bolt attachment as set forth in claim 5, wherein said fiber reinforced ply is a fiberglass ply.

9. A method of attaching a bolt attachment to a composite fan case in a gas turbine engine comprising the steps of:
    placing a fiber reinforced ply and adhesive combination at an inner side of a boss, the boss receiving a plurality of metallic inserts, each of said metallic inserts including an internally threaded bore;
    attaching the bolt attachment to the composite fan case by heating and curing the fiber reinforced ply and adhesive combination; and
    wherein each of said metallic inserts receives a threaded insert.

10. The method as set forth in claim 9, including the step of placing a combination of adhesive and fiber reinforced ply on a surface of said composite boss remote from the outer surface of said fan case.

11. The method as set forth in claim 10, wherein said combination of adhesive and fiber reinforced ply on a surface of said composite boss remote from the outer surface extends beyond the boss, and has a portion in contact with said fiber reinforced ply and adhesive combination that is placed at the inner side of said boss.

12. The method as set forth in claim 9, wherein an accessory is attached to the threaded bore.

13. The method as set forth in claim 12, wherein a single accessory is attached to at least two of said metallic inserts by threaded fasteners.

* * * * *